United States Patent
Ahn (10) Patent No.: US 9,580,949 B2
(45) Date of Patent: Feb. 28, 2017

(54) APPARATUS FOR SUPPORTING DISPLAY PANEL

(71) Applicant: Samsung Display Co., Ltd., Yongin, Gyeonggi-Do (KR)

(72) Inventor: Sung Sang Ahn, Hwaseong-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/932,852

(22) Filed: Nov. 4, 2015

(65) Prior Publication Data

US 2016/0230436 A1    Aug. 11, 2016

(30) Foreign Application Priority Data

Feb. 9, 2015    (KR) .................. 10-2015-0019673

(51) Int. Cl.
  *E05D 3/12*    (2006.01)
  *G06F 1/16*    (2006.01)
  *E05D 11/06*   (2006.01)

(52) U.S. Cl.
  CPC ............... *E05D 3/12* (2013.01); *G06F 1/16* (2013.01); *E05D 11/06* (2013.01)

(58) Field of Classification Search
  CPC .... E05D 3/12; E05D 3/06; E05D 3/10; E05D 3/122; E05D 11/06; G06F 1/1681; G06F 1/1616; G06F 1/1618; E05Y 2900/606; H04M 1/0216; H04M 1/0222; H04M 1/022; H05K 5/0226; Y10T 16/547; Y10T 16/541
  See application file for complete search history.

(56) References Cited

U.S. PATENT DOCUMENTS

| 9,021,658 B1* | 5/2015 | Yang ............... G06F 1/1681 16/366 |
| 9,103,147 B1* | 8/2015 | Chuang ............ G06F 1/1681 |
| 2009/0000062 A1* | 1/2009 | Yamanami ........ G06F 1/1616 16/366 |

(Continued)

FOREIGN PATENT DOCUMENTS

| JP | 2005-225378 A | 8/2005 |
| KR | 10-0167928 B1 | 9/1998 |

(Continued)

*Primary Examiner* — Chuck Mah
(74) *Attorney, Agent, or Firm* — Knobbe Martens Olson & Bear LLP (57) ABSTRACT

An apparatus for supporting a display panel is disclosed. In one aspect, the apparatus includes first and second support portions configured to support a display panel and respectively rotatable based on first and second rotation axes substantially parallel to each other. The apparatus also includes a first connecting portion positioned on the first rotation shaft and fixedly combined to one side of the first support portion and a second connecting portion positioned on the second rotation shaft and fixedly combined to one side of the second support portion. The apparatus further includes a spacer maintaining a constant distance between the first and second rotation axes, wherein the spacer is penetrated by the first and second connecting portions such that the first and second connecting portions are rotatable and a link member rotatably combined to one side of the first connecting portion and one side of the second connecting portion.

21 Claims, 11 Drawing Sheets

(56) References Cited

U.S. PATENT DOCUMENTS

| | | | | |
|---|---|---|---|---|
| 2011/0289726 A1* | 12/2011 | Zhang | ............... | G06F 1/1681 16/250 |
| 2012/0047685 A1* | 3/2012 | Ma | ............... | G06F 1/1681 16/319 |
| 2012/0192381 A1* | 8/2012 | Zhang | ............... | G06F 1/1681 16/366 |
| 2014/0352113 A1* | 12/2014 | Chen | ............... | H04M 1/022 16/366 |
| 2015/0013107 A1* | 1/2015 | Shin | ............... | E05D 3/06 16/366 |
| 2015/0040353 A1* | 2/2015 | Chen | ............... | G06F 1/1681 16/366 |

FOREIGN PATENT DOCUMENTS

| KR | 10-0791266 B1 | 12/2007 |
|---|---|---|
| KR | 10-2010-0008805 A | 1/2010 |

\* cited by examiner

APPARATUS FOR SUPPORTING DISPLAY PANEL

INCORPORATION BY REFERENCE TO ANY PRIORITY APPLICATIONS

This application claims priority to and the benefit of Korean Patent Application No. 10-2015-0019673 filed in the Korean Intellectual Property Office on Feb. 9, 2015, the entire contents of which are incorporated herein by reference.

BACKGROUND

Field

The described technology generally relates to an apparatus for supporting a display panel.

Description of the Related Technology

Currently, as generally known display devices, there are a liquid crystal display (LCD), a plasma display panel (PDP), an organic light-emitting diode (OLED) display, a field effect display (FED), an electrophoretic display, and the like.

Particularly, the OLED display includes two electrodes and an organic emission layer interposed therebetween. Electrons injected from one electrode and holes injected from the other electrode are combined in the organic emission layer to generate excitons, and the generated excitons release energy to emit light.

OLED technology has favorable characteristics such as a reduced thickness and weight, low power consumption, high luminance, and high response speed and thus it is considered to be a next generation display.

SUMMARY OF CERTAIN INVENTIVE ASPECTS

One inventive aspect relates to an apparatus for supporting a display panel of a flexible display that is bendable or foldable.

Another aspect is an apparatus for supporting a display panel that includes: first and second support portions supporting a display panel and rotatable based on first and second rotation shafts parallel to each other; a first connecting portion positioned on the first rotation shaft and fixedly combined to one side of the first support portion; a second connecting portion positioned on the second rotation shaft and fixedly combined to one side of the second support portion; a spacer penetrated by the first and second connecting portions such that they are rotatable and maintaining a constant distance between the first and second rotation shafts; and a link member rotatably combined to one side of the first connecting portion and one side of the second connecting portion.

The first connecting portion may include: a first penetration member parallel to the first rotation shaft and having one end portion penetrating the spacer to be fixedly combined to the one side of the first support portion; and a first connecting plate combined to the other end portion of the first penetration member and to which the link member is combined, and the second connecting portion may include: a second penetration member parallel to the second rotation shaft and having one end portion penetrating the spacer to be fixedly combined to the one side of the second support portion; and a second connecting plate combined to the other end portion of the second penetration member and to which the link member is combined.

A first coupling protrusion may be formed at one side of the first connecting plate, a second coupling protrusion may be formed at one side of the second connecting plate, and the first and second coupling protrusions may be combined to the link member such that they are rotatable.

Based on a plane including the first and second rotation shafts, one of the first and second coupling protrusions may be positioned in an upper area of the plane, while the other may be positioned in a lower plane.

When quadrants are formed on the first connecting plate by a first axis included in the plane and perpendicular to the first and second rotation shafts and a second axis perpendicular to the first axis, quadrants are formed on the second connecting plate by the first axis and a third axis perpendicular to the first axis and the second rotation shaft, and the first and second support portions are folded with respect to each other, the first coupling protrusion may be positioned in a first quadrant of the first connecting plate, and the second coupling protrusion may be positioned in a fourth quadrant of the second connecting plate.

When the first and second support portions are unfolded, the first coupling protrusion may be positioned in a second quadrant of the first connecting plate, and the second coupling protrusion may be positioned in a third quadrant of the second connecting plate.

When quadrants are formed on the first connecting plate by a first axis included in the plane and perpendicular to the first and second rotation shafts and a second axis perpendicular to the first axis, quadrants are formed on the second connecting plate by the first axis and a third axis perpendicular to the first axis and the second rotation shaft, the first and second support portions are folded with respect to each other, the first coupling protrusion may be positioned in a third quadrant of the first connecting plate, and the second coupling protrusion may be positioned in a second quadrant of the second connecting plate.

When the first and second support portions are unfolded, the first coupling protrusion may be positioned in a fourth quadrant of the first connecting plate, and the second coupling protrusion may be positioned in a first quadrant of the second connecting plate.

The first and second connecting plates may have a circular shape.

The first and second connecting plates may form the same plane.

The first connecting portion may further include a first stopper that is positioned on the first connecting plate to prevent the first support portion from being rotated by more than a predetermined angle, and the second connecting portion may further include a second stopper that is positioned on the second connecting plate to prevent the second support portion from being rotated by more than a predetermined angle.

The first connecting portion may further include a first magnetic member positioned on the first stopper, the second connecting portion may further include a second magnetic member positioned on the second stopper, and a third magnetic member that can be combined to the first or second magnetic member may be positioned on the link member.

First and second penetration holes may be formed in the spacer to be penetrated by the first and second penetration members.

The first and second support portions may form an angle of 0° to 180°.

When the first and second support portions are rotated, the first and second support portions may be rotated based on a plane including the first and second rotation shafts while maintaining the same angle therebetween. The first and second support portions may have a plate-like shape. The link member may be a bar-shaped member.

Another aspect is an apparatus for supporting a display panel comprising: first and second support portions configured to support a display panel and respectively rotatable based on first and second rotation shafts substantially parallel to each other; a first connecting portion positioned on the first rotation shaft and fixedly combined to one side of the first support portion; a second connecting portion positioned on the second rotation shaft and fixedly combined to one side of the second support portion; a spacer maintaining a constant distance between the first and second rotation shafts, wherein the spacer is penetrated by the first and second connecting portions such that the first and second connecting portions are rotatable; and a link member rotatably combined to one side of the first connecting portion and one side of the second connecting portion.

In the above apparatus, the first connecting portion includes: a first penetration member substantially parallel to the first rotation shaft and having one end portion penetrating the spacer to be fixedly combined to the one side of the first support portion; and a first connecting plate combined to the other end portion of the first penetration member and to which the link member is combined, and wherein the second connecting portion includes: a second penetration member substantially parallel to the second rotation shaft and having one end portion penetrating the spacer to be fixedly combined to the one side of the second support portion; and a second connecting plate combined to the other end portion of the second penetration member and to which the link member is combined.

The above apparatus further comprises a first coupling protrusion formed at one side of the first connecting plate and a second coupling protrusion formed at one side of the second connecting plate, and wherein the first and second coupling protrusions are combined to the link member such that they are rotatable. In the above apparatus, based on a plane including the first and second rotation shafts, one of the first and second coupling protrusions is positioned in an upper area of the plane, and the other coupling protrusion is positioned in a lower area of the plane.

In the above apparatus, quadrants are formed on the first connecting plate by a first axis included in the plane and perpendicular to the first and second rotation shafts and a second axis perpendicular to the first axis, and quadrants are formed on the second connecting plate by the first axis and a third axis perpendicular to the first axis and the second rotation shaft, when the first and second support portions are folded with respect to each other, the first coupling protrusion is positioned in a first quadrant of the first connecting plate, and the second coupling protrusion is positioned in a fourth quadrant of the second connecting plate. In the above apparatus, when the first and second support portions are unfolded, the first coupling protrusion is positioned in a second quadrant of the first connecting plate, and the second coupling protrusion is positioned in a third quadrant of the second connecting plate.

In the above apparatus, quadrants are formed on the first connecting plate by a first axis included in the plane and perpendicular to the first and second rotation shafts and a second axis perpendicular to the first axis, and quadrants are formed on the second connecting plate by the first axis and a third axis perpendicular to the first axis and the second rotation shaft, when the first and second support portions are folded with respect to each other, the first coupling protrusion is positioned in a third quadrant of the first connecting plate, and the second coupling protrusion is positioned in a second quadrant of the second connecting plate. In the above apparatus, when the first and second support portions are unfolded, the first coupling protrusion is positioned in a fourth quadrant of the first connecting plate, and the second coupling protrusion is positioned in a first quadrant of the second connecting plate.

In the above apparatus, the first and second connecting plates have a circular shape. In the above apparatus, the first and second connecting plates are formed on the same plane. In the above apparatus, the first connecting portion further includes a first stopper that is positioned on the first connecting plate to prevent the first support portion from being rotated by more than a predetermined angle, and wherein the second connecting portion further includes a second stopper that is positioned on the second connecting plate to prevent the second support portion from being rotated by more than a predetermined angle.

In the above apparatus, the first connecting portion further includes a first magnetic member positioned on the first stopper, wherein the second connecting portion further includes a second magnetic member positioned on the second stopper, and wherein the apparatus further comprises a third magnetic member configured to be combined to the first or second magnetic member and positioned on the link member. In the above apparatus, first and second penetration holes are formed in the spacer to be penetrated by the first and second penetration members. In the above apparatus, the first and second support portions form an angle of 0° to 180°.

In the above apparatus, when the first and second support portions are rotated, the first and second support portions are rotated based on a plane including the first and second rotation shafts while maintaining the same angle therebetween. In the above apparatus, the first and second support portions have a plate-like shape. In the above apparatus, the link member is a bar-shaped member.

Another aspect is an apparatus for supporting a display panel comprising: first and second supports configured to support a display panel and at least partially rotate with respect to first and second rotation axes that are substantially parallel to each other; a first connector rotatably connected to the first support and configured to rotate with respect to the first rotation axis; a second connector rotatably connected to the second support and configured to rotate with respect to the second rotation axis; a spacer at least partially surrounding the first and second connectors, wherein each of the first and second connectors comprises a protrusion passing through a portion of the spacer and configured to maintain a constant distance between the first and second rotation axes, and wherein the protrusions are respectively parallel to the first and second rotation axes; and a link member rotatably connecting the first and second connectors.

In the above apparatus, the protrusions of the first and second connectors respectively contact the first and second supports. In the above apparatus, the link member is configured to rotate the first sand second connectors in opposite directions, and wherein the first and second supports are configured to rotate in opposite directions by the rotations of the first and second connectors.

According to at least one of the disclosed embodiments, the two support portions can be rotated by the simple link member to support the display panel based on the respective rotation shafts, irrespective of the distance between the two rotation shafts.

DETAILED DESCRIPTION OF CERTAIN INVENTIVE EMBODIMENTS

Recently, bendable or foldable displays are being developed. In order for a display panel to be bendable or foldable, an apparatus for supporting the display panel also needs to be bendable or foldable.

Embodiments will be described more fully hereinafter with reference to the accompanying drawings.

In the drawings, the thickness of layers and regions may be exaggerated for clarity.

In addition, when a layer is described to be formed "on" another layer or substrate, this means that the layer may be formed directly on the other layer or substrate, or a third layer may be interposed between the layer and the other layer or the substrate.

Like reference numerals designate like elements throughout the specification. In this disclosure, the term "substantially" includes the meanings of completely, almost completely or to any significant degree under some applications and in accordance with those skilled in the art. The term "connected" includes an electrical connection.

Figure 1:
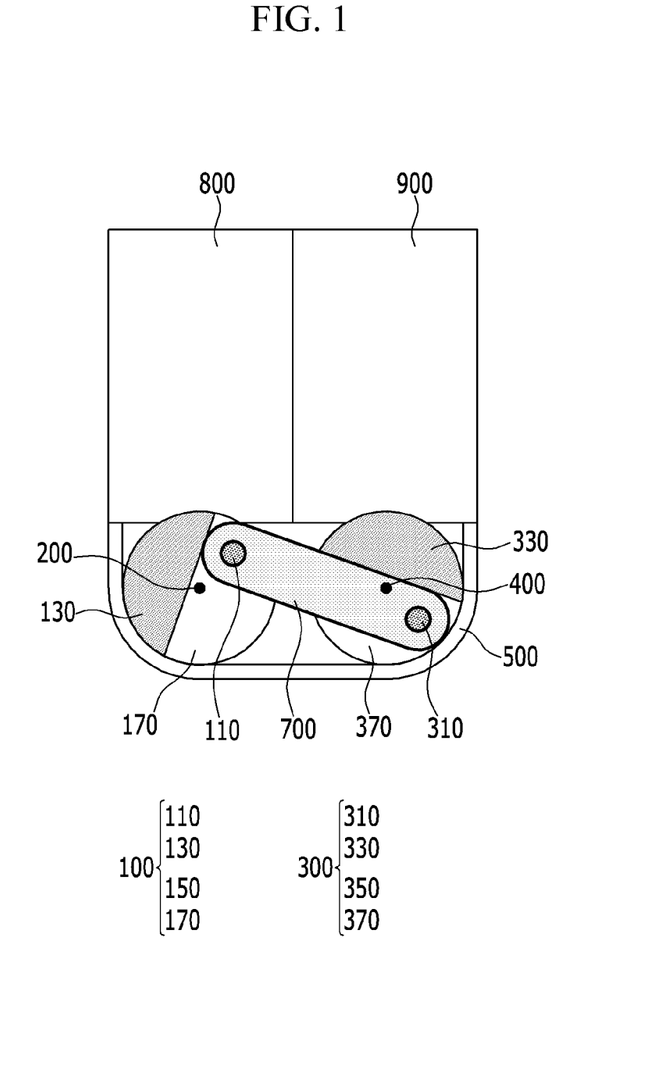
FIG. 1 is a side view of an apparatus for supporting a display panel according to an exemplary embodiment in a folded state.
Figure 2:
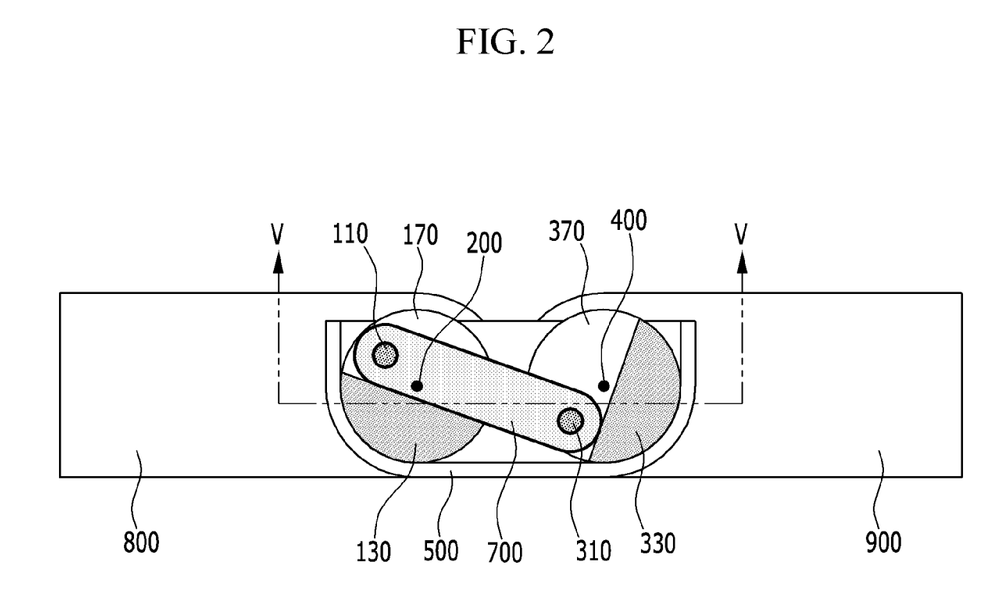
FIG. 2 is a side view of the apparatus for supporting the display panel according to the exemplary embodiment in an unfolded state.
Figure 3:
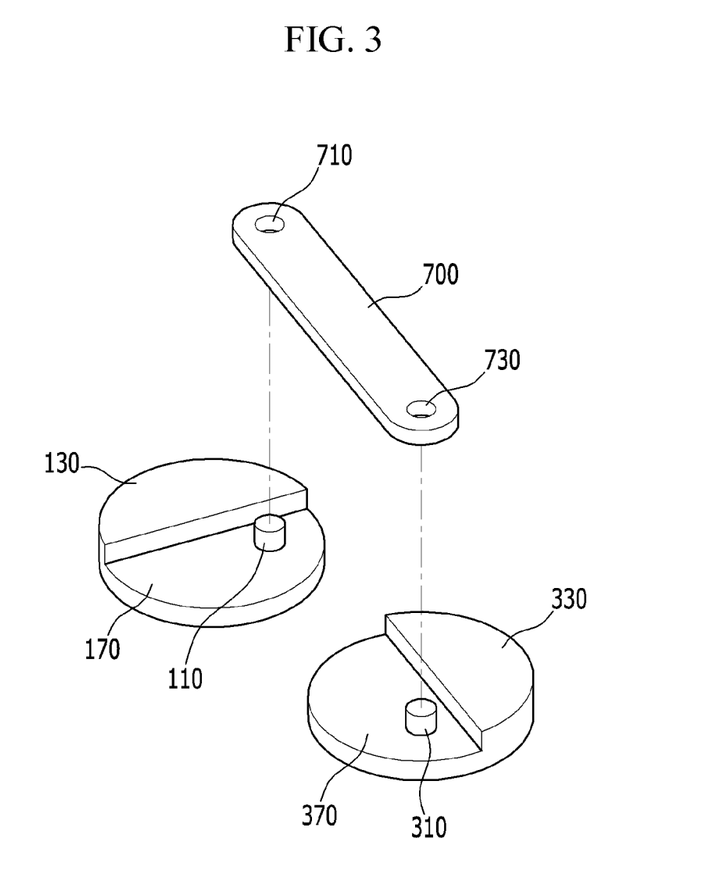
FIG. 3 is a partial exploded perspective view of the apparatus for supporting the display panel.

Referring to FIGS. 1 to 3, an apparatus for supporting a display panel according to an exemplary embodiment provides a simple support device that can be rotated based on two rotation shafts while supporting a flexible display panel, irrespective of a distance between the two rotation shafts.

Referring to FIGS. 1 and 2, the apparatus for supporting the display panel includes first and second connecting portions (or first and second connectors) 100 and 300, a spacer 500, a link member 700, and first and second support portions (or first and second supports) 800 and 900.

First, the first and second support portions 800 and 900 support the display panel (not shown) that is foldable or bendable. Referring to FIG. 2, the display panel (not shown) may be placed on the unfolded first and second support portions 800 and 900. The first and second support portions 800 and 900 may be rotated based on first and second rotation shafts 200 and 400, respectively, thereby allowing the display panel (not shown) to be bendable or foldable.

Herein, the first and second rotation shafts 200 and 400 may be placed substantially parallel to each other, as shown in FIG. 1. In this case, the first and second support portions 800 and 900 may have a plate-like shape. The first and second support portions 800 and 900 may have sizes corresponding to that of the display panel that is positioned on them. The first connecting portion 100 is fixedly combined to one side of the first support portion 800. In this case, the first connecting portion 100 is positioned on the first rotation shaft 200.

That is, when the first connecting portion 100 is fixed to one side of the first support portion 800 and the first support portion 800 is then rotated based on the first rotation shaft 200, the first connecting portion 100 may be rotated along with the first support portion 800. In this case, the first connecting portion 100 may be connected to the second connecting portion 300 through the link member 700 to be described later such that it is rotated along with the first support portion 800. The first connecting portion 100 includes a first connecting plate 170, a first penetration member 150, a first coupling protrusion 110, and a first stopper 130.

Referring to FIGS. 1 to 3 and 5, the first connecting plate 170 is placed at one side of the first support portion 800. The first connecting plate 170 is combined to the link member 700 to be described later through the first coupling protrusion 110. The first connecting plate 170 may have a plate-like shape. According to the exemplary embodiment, the first connecting plate 170 has a circular plate-like shape. In this case, the first rotation shaft 200 is placed to cross a center of the first connecting plate 170.

The first stopper 130 is placed on the first connecting plate 170. The first stopper 130 has a semicircular plate-like shape, and is positioned on the first connecting plate 170. When the first connecting plate 170 connected to the first support portion 800 is rotated, the first stopper 130 prevents the first connecting plate 170 from being rotated by more than a predetermined angle.

As shown in FIG. 3, since the first stopper 130 protrudes further than the first connecting plate 170, the first stopper 130 prevents the first support portion 800 from being rotated by more than the predetermined angle. For example, it is assumed that the first support portion 800 is rotated from a position illustrated in FIG. 1 to a position illustrated in FIG. 2, that is, the first support portion 800 is rotated by 90° in a counterclockwise direction based on the first rotation shaft 200.

In this case, the first connecting plate 170 illustrated in FIG. 1 is combined to the link member 700 through the first coupling protrusion 110. Then, as shown in FIG. 2, when the first connecting plate 170 is rotated by a predetermined rotation angle in the counterclockwise direction, the first connecting plate 170 cannot be rotated any further because of the first stopper 130.

That is, as shown in FIG. 2, the first connecting plate 170 cannot be rotated by more than 90° from the original position of the first connecting plate 170 illustrated in FIG. 1. In addition, referring to FIG. 5, the first penetration member 150 is combined under the first connecting plate 170. The first penetration member 150 penetrates the spacer 500 to be described later, and is combined to one side of the first support portion 800.

The first connecting plate 170 may be fixedly combined to the first support portion 800 by the first penetration member 150. The first coupling protrusion 110 is formed on the first connecting plate 170. The first coupling protrusion 110 is combined to the link member 700 such that it is rotatable.

Referring to FIG. 3, the first coupling protrusion 110 is combined to a first coupling hole 710 of the link member 700. In some embodiments, the first coupling protrusion 110 is formed on a predetermined position on the first connecting plate 170.

More specifically, referring to FIG. 1, when the first and second support portions 800 and 900 are folded with respect to each other, the first coupling protrusion 110 is positioned in a first quadrant of the first connecting plate 170. Herein, when the first and second support portions 800 and 900 are folded with respect to each other, the first and second support portions 800 and 900 form an angle of about 0°.

In addition, referring to FIG. 2, when the first and second support portions 800 and 900 are unfolded, the first coupling protrusion 110 is positioned in a second quadrant of the first connecting plate 170. Herein, when the first and second support portions 800 and 900 are unfolded, the first and second support portions 800 and 900 form an angle of about 180°. Herein, quadrants of the first connecting plate 170 represent quadrants that are formed on the first connecting plate 170 by an X axis perpendicular to the first and second rotation shafts 200 and 400 and an Y1 axis perpendicular to the X axis and crossing the center of the first connecting plate 170.

In this case, the X axis is included in a plane that is formed by the first and second rotation shafts 200 and 400. The X and Y1 axes may correspond to the first shaft and the second shaft in the claims. A position of the first coupling protrusion 110 according to rotation of the first and second support portions 800 and 900 will be specifically described later. The second connecting portion 300 is fixedly combined to one side of the second support portion 900.

In this case, the second connecting portion 300 is positioned on the second rotation shaft 400. That is, when the second support portion 900 is rotated based on the second rotation shaft 400, the second connecting portion 300 may be rotated along with the second support portion 900 since it is fixed to one side of the second support portion 900. The second connecting portion 300 includes a second connecting plate 370, a second penetration member 350, a second coupling protrusion 310, and a second stopper 330.

Referring to FIGS. 1 to 3 and 5, the second connecting plate 370 is placed at one side of the second support portion 900. The second connecting plate 370 is combined to the link member 700 to be described later through the second coupling protrusion 310. The second connecting plate 370 may have a plate-like shape.

The second connecting plate 370 may have a circular plate-like shape. In this case, the second rotation shaft 400 is placed to cross a center of the second connecting plate 370. The second stopper 330 is placed on the second connecting plate 370.

The second stopper 330 has a semicircular plate-like shape, and is positioned on the second connecting plate 370. In this case, when the second connecting plate 370 connected to the second support portion 900 is rotated, the second stopper 330 prevents the second connecting plate 370 from being rotated by more than a predetermined angle.

As shown in FIG. 3, since the second stopper 330 protrudes further than the second connecting plate 370, the second stopper 330 prevents the second connecting plate 370 from being rotated by more than the predetermined angle. For example, it is assumed that the second support portion 900 is rotated from a position illustrated in FIG. 1 to a position illustrated in FIG. 2, that is, the second support portion 900 is rotated by 90° in the clockwise direction based on the second rotation shaft 400.

In this case, the second connecting plate 370 illustrated in FIG. 1 is combined to the link member 700 through the second coupling protrusion 310. Then, as shown in FIG. 2, when the second connecting plate 370 is rotated by a predetermined rotation angle in the clockwise direction, the second connecting plate 370 cannot be rotated any further by the second stopper 330.

That is, as shown in FIG. 2, the second connecting plate 370 cannot be rotated by more than 90° from the original position of the second connecting plate 370 illustrated in FIG. 1. In addition, referring to FIG. 5, the second penetration member 350 is combined under the second connecting plate 370. The second penetration member 350 penetrates the spacer 500 to be described later, and is combined to one side of the second support portion 900.

The second connecting plate 370 may be fixedly combined to the second support portion 900 by the second penetration member 350. The second coupling protrusion 310 is formed on the second connecting plate 370. The second coupling protrusion 310 is combined to the link member 700 such that it is rotatable. Referring to FIG. 3, the second coupling protrusion 310 is combined to a second coupling hole 730 of the link member 700.

Similar to the first coupling protrusion 110 described above, the second coupling protrusion 310 is formed at a predetermined position on the second connecting plate 370. Referring to FIG. 1, when the first and second support portions 800 and 900 are folded with respect to each other, the second coupling protrusion 310 is positioned in a fourth quadrant of the second connecting plate 370.

In addition, referring to FIG. 2, when the first and second support portions 800 and 900 are unfolded with respect to each other, the second coupling protrusion 310 is positioned in a third quadrant of the second connecting plate 370. Herein, quadrants of the second connecting plate 370 represents the quadrants that are formed on the second connecting plate 370 by the X axis and an Y2 axis perpendicular to the X axis and crossing the center of the second connecting plate 370.

Figure 5:
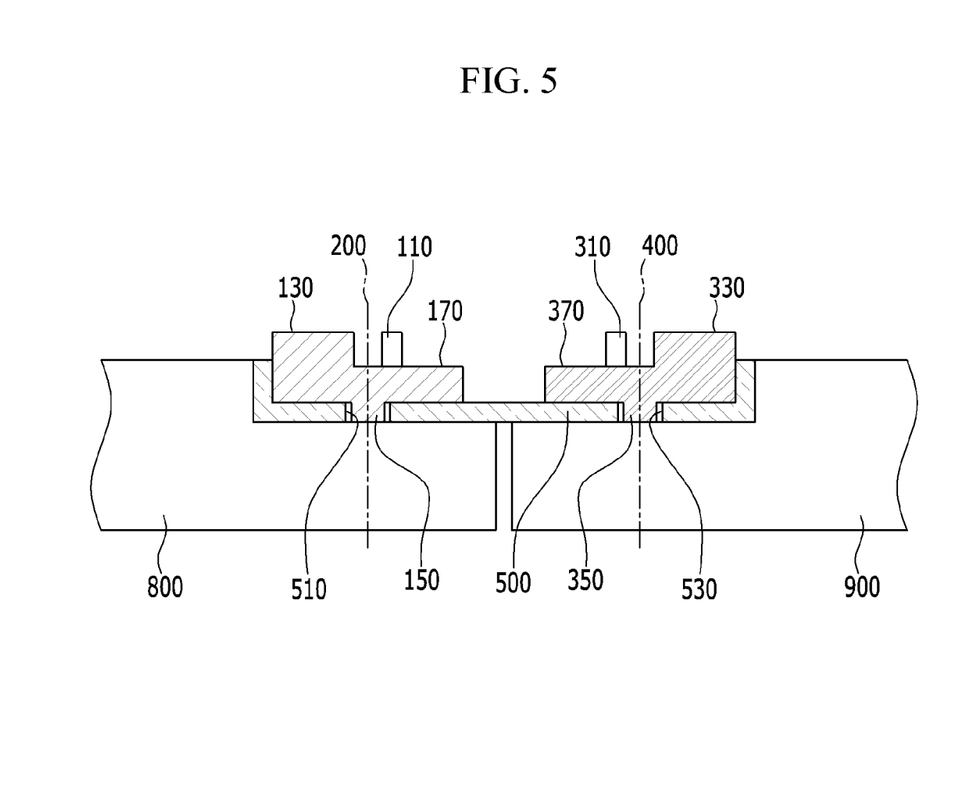
FIG. 5 is a cross-sectional view of the apparatus for supporting the display panel of FIG. 2 taken along the line V-V.

In this case, the Y2 axis may correspond to a third axis in the claims. A position of the second coupling protrusion 310 according to the rotation of the first and second support portions 800 and 900 will be specifically described later. Referring to FIG. 5, the first and second connecting plates 170 and 370 are placed to form the same plane at the sides of the first and second support portions 800 and 900.

Figure 10:
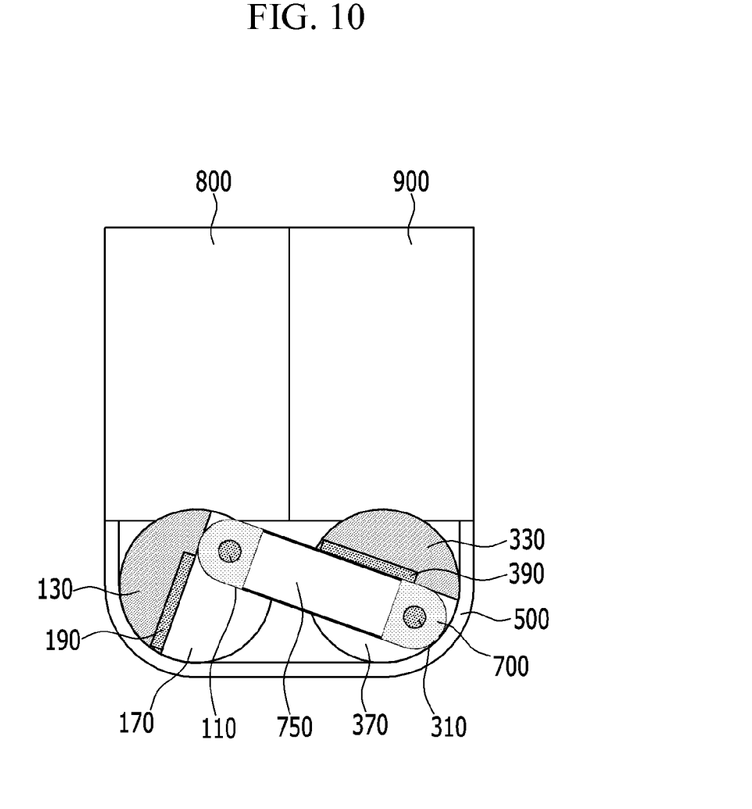
FIG. 10 is a side view of the apparatus for supporting the display panel to which magnetic members are attached.
Figure 11:
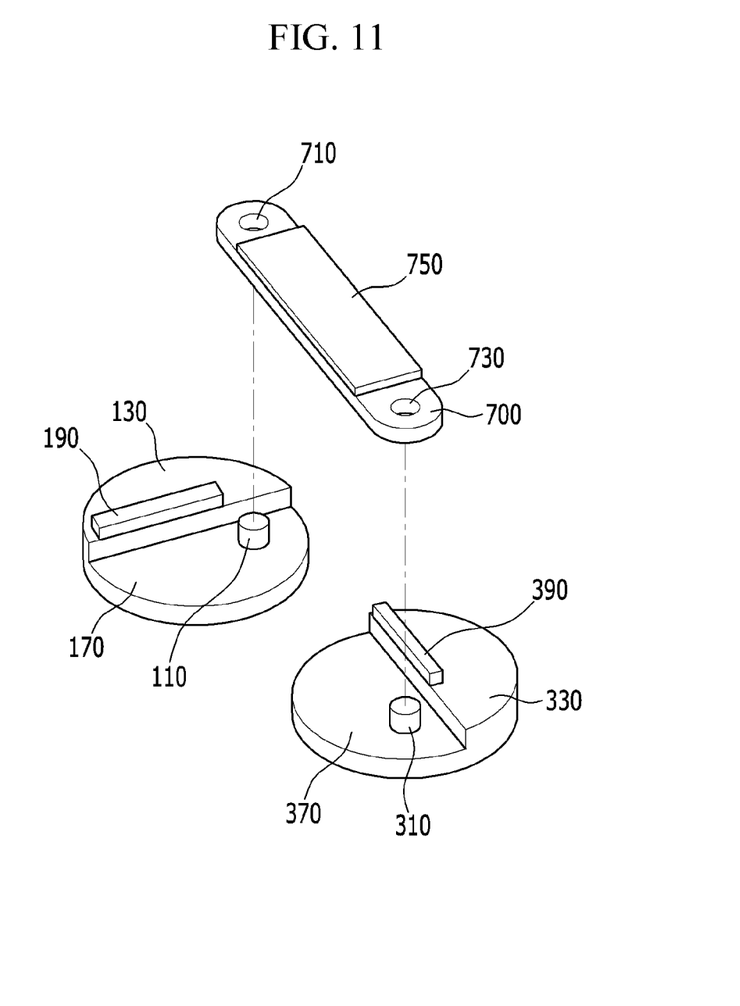
FIG. 11 is a partial exploded perspective view of the apparatus for supporting the display panel to which the magnetic members are attached.

As shown in FIG. 5, the first and second connecting plates 170 and 370 form the same plane, and the link member 700 is placed on the first and second connecting plates 170 and 370. Referring to FIGS. 10 and 11, first and second magnetic members 190 and 390 may be placed on the first and second stopper 130 and 330.

In addition, a third magnetic member 750 may be placed on the link member 700. Referring to FIG. 10, when the first stopper 130 and the link member 700 contact each other, the first magnetic member 190 is placed such that it contacts the third magnetic member 750 positioned on the link member 700 and such that it forms the same plane as one side of the first stopper 130.

When the first and second support portions 800 and 900 are unfolded with respect to each other, the first and third magnetic members 190 and 750 contact each other. Similarly, when the second stopper 330 and the link member 700 contact each other, the second magnetic member 390 is placed such that it forms the same plane as one side of the second stopper 330 and such that it contacts the third magnetic member 750 positioned on the link member 700.

When the first and second support portions 800 and 900 are folded with respect to each other, as shown in FIG. 10, the second and third magnetic members 390 and 750 contact each other. The third magnetic member 750 is placed on the link member 700. As described above, the third magnetic member 750 may contact the first or second magnetic members 190 and 390.

As such, the first and second support portions 800 and 900 having reached desired positions may be identified by the contacts between the first and second magnetic members 190 and 390 and the third magnetic member 750 contact each other when the first and second support portions 800 and 900 are rotated to be folded or unfolded.

Alternatively, since the magnetic members are combined to each other by a magnetic force in their respective positions, the first and second support portions 800 and 900 are prevented from being rotated contrary to a user's intention.

Referring back to FIGS. 1 to 3, the first and second connecting plates 170 and 370 are combined to the link member 700 such that they are rotatable. In this case, the link member 700 may be a bar-shaped member. As described above, when the first and second connecting plates 170 and 370 are rotated to reach the specific positions, sides of the bar-shaped link member 700 may make surface contact with the first or second stopper 130 and 330. In addition, the first and second coupling holes 710 and 730 are formed in opposite end portions of the link member 700, respectively. The first and second coupling protrusions 110 and 310 formed in the first and second connecting plates 170 and 370 described above are inserted into the first and second coupling holes 710 and 730, respectively.

Figure 4:
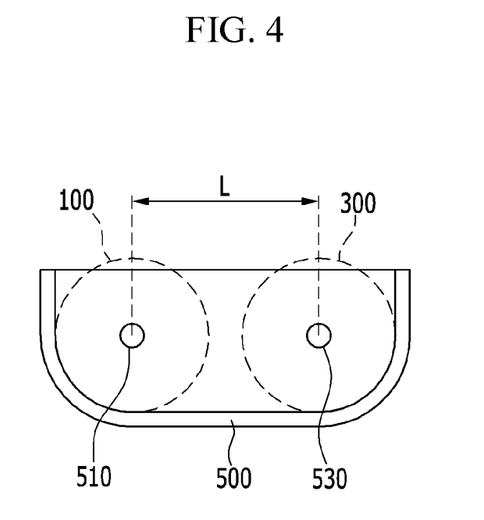
FIG. 4 is a top plan view of a spacer of the apparatus for supporting the display panel.

Referring to FIGS. 4 and 5, the spacer 500 is placed between the first and second connecting portions 100 and 300 and the first and second support portions 800 and 900. The spacer 500 may maintain a distance L between the first and second rotation shafts 200 and 400 to be constant. As shown in FIG. 5, as the first and second connecting portions 100 and 300 penetrate the spacer 500, an interval between the first and second rotation shafts 200 and 400 is maintained constant. More specifically, first and second penetration holes 510 and 530 are formed in the spacer 500.

The first penetration member 150 of the first connecting portion 100 and the second penetration member 350 of the second connecting portion 300 penetrate the first and second penetration holes 510 and 530, respectively. In this case, since the first and second penetration members 150 and 350 are respectively parallel to the first and second rotation shafts 200 and 400, respectively, the distance L between the first and second rotation shafts 200 and 400 may be maintained constant when the first and second support portions 800 and 900 are rotated.

The first and second support portions 800 and 900 may be rotated by the same angle based on the plane that is formed by the first and second rotation shafts 200 and 400. Herein, the plane formed by the first and second rotation shafts 200 and 400 represent a plane including the first and second rotation shafts 200 and 400. That is, when the first support portion 800 is rotated by the predetermined angle based on the plane, the second support portion 900 may also be simultaneously rotated by the same angle based on the plane.

The first and second support portions 800 and 900 may be rotated by an angle of 0° to 180°. More specifically, the first and second support portions 800 and 900 illustrated in FIG. 1 form an angle of about 0° with respect to each other. The first and second support portions 800 and 900 illustrated in FIG. 2 form an angle of about 180°. In this case, the first and second support portions 800 and 900 start rotating at the position illustrated in FIG. 1.

As the angle formed by the first and second support portions 800 and 900 increases, the first and second support portions 800 and 900 may be rotated to the position illustrated in FIG. 2 where the angle formed by the first and second support portions 800 and 900 is 180°. As a result, the first and second support portions 800 and 900 may be upwardly rotated based on the plane that is formed by the first and second rotation shafts 200 and 400 described above.

Now, an operation of the first and second connecting portions 100 and 300 and the link member 700 of the apparatus for supporting the display panel according to the exemplary embodiment will be described with reference to FIGS. 6 to 9. In some embodiments, based on the plane including the first and second rotation shafts 200 and 400, one of the first and second coupling protrusions 110 and 310 is positioned in an upper area of th plane, while the other is positioned in a lower area of the plane.

One of the first and second coupling protrusions 110 and 310 is positioned in the upper area of the plane, while the other is positioned in the lower area of the plane. Alternatively, if the first coupling protrusion 110 is positioned in the lower area of the plane, the second coupling protrusion 310 is positioned in the upper area of the plane.

Figure 6:
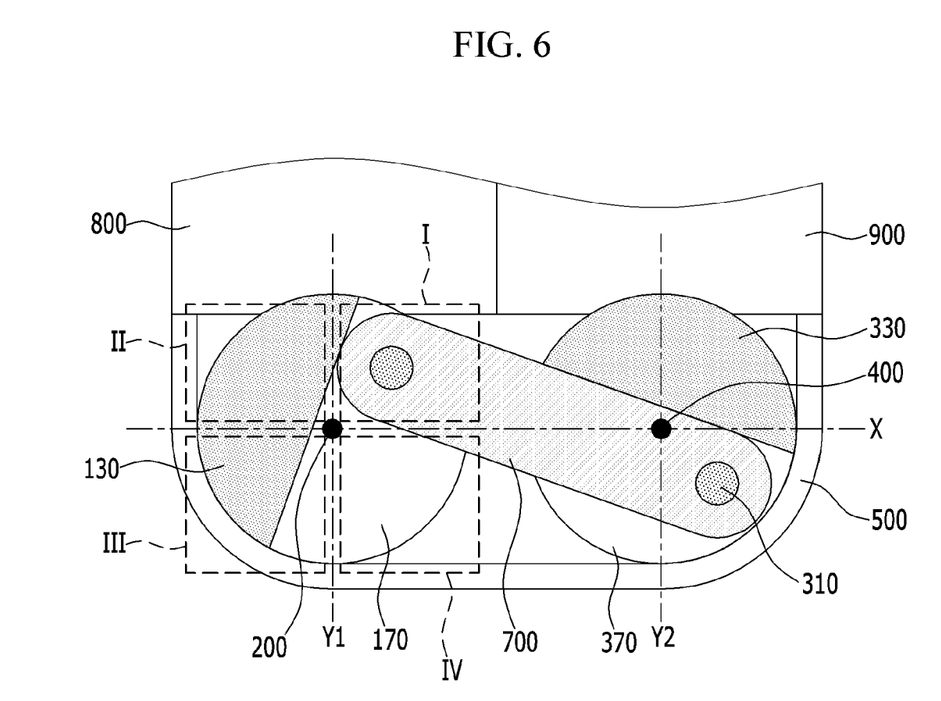
FIGS. 6, 7, 8, and 9 are drawings for illustrating an operation of the apparatus for supporting the display panel.
Figure 7:
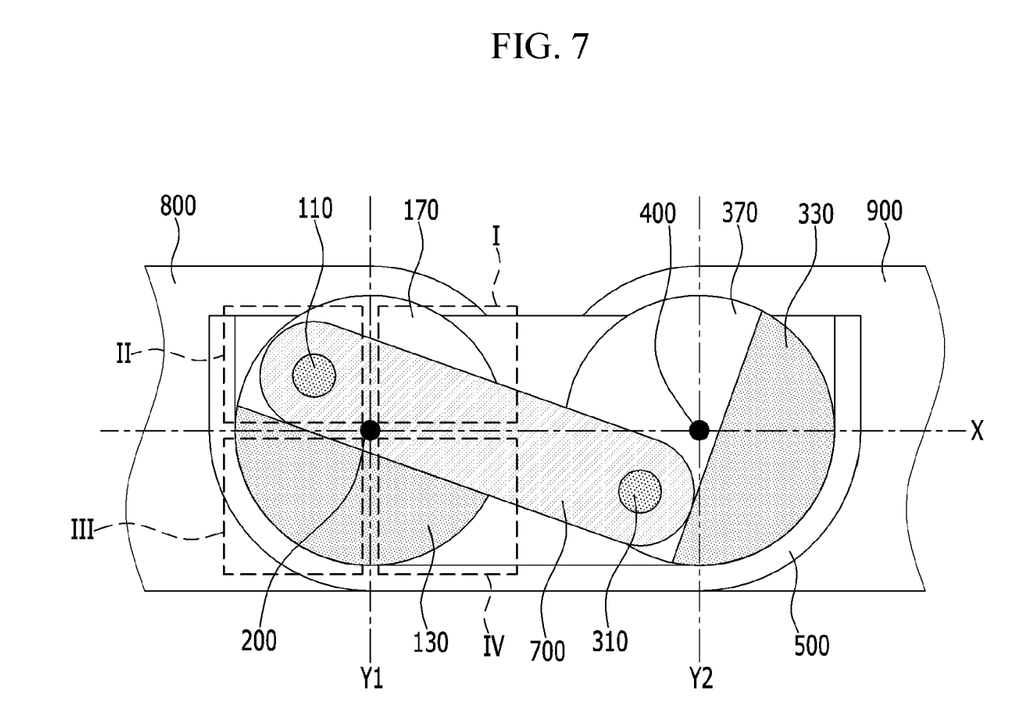

First, a case in which the first coupling protrusion 110 is positioned in the upper area of the plane and the second coupling protrusion 310 is positioned in the lower area of the plane will be described with reference to FIGS. 6 and 7. Referring to FIG. 6, when the first and second support portions 800 and 900 are folded with respect to each other, the first coupling protrusion 110 is placed in a first quadrant of the first connecting plate 170, that is, in the upper area of the plane.

In this case, the second coupling protrusion 310 is positioned in a fourth quadrant of the second connecting plate 370, that is, in the lower area of the plane. In this case, the link member 700 contacts the second stopper 330. Herein, quadrants of the first connecting plate 170 represent the quadrants that are formed on the first connecting plate 170 by the aforementioned X and Y1 axes.

In addition, the first quadrant of the first connecting plate 170 represents an I region of FIG. 6, a second quadrant of the first connecting plate 170 represents an II region, a third quadrant of the first connecting plate 170 represents an III region, and the fourth quadrant of the first connecting plate 170 represents an IV region. Similarly, quadrants of the second connecting plate 370 represent the quadrants that are formed on the second connecting plate 370 by the aforementioned X and Y2 axes.

In addition, the first to fourth quadrants of the second connecting plate 370 correspond to the quadrants of the first connecting plate 170. In addition, referring to FIG. 7, when the first and second support portions 800 and 900 are unfolded with respect to each other, the first coupling protrusion 110 is positioned in the second quadrant of the first connecting plate 170, that is, in the upper area of the plane.

In this case, the link member 700 contacts the first stopper 130. The second coupling protrusion 310 is positioned in the third quadrant of the second connecting plate 370, that is, in the lower area of the plane. Next, a case in which the first coupling protrusion 110 is positioned in the lower area of the plane and the second coupling protrusion 310 is positioned in the upper area of the plane will be described with reference to FIGS. 8 and 9.

Figure 8:
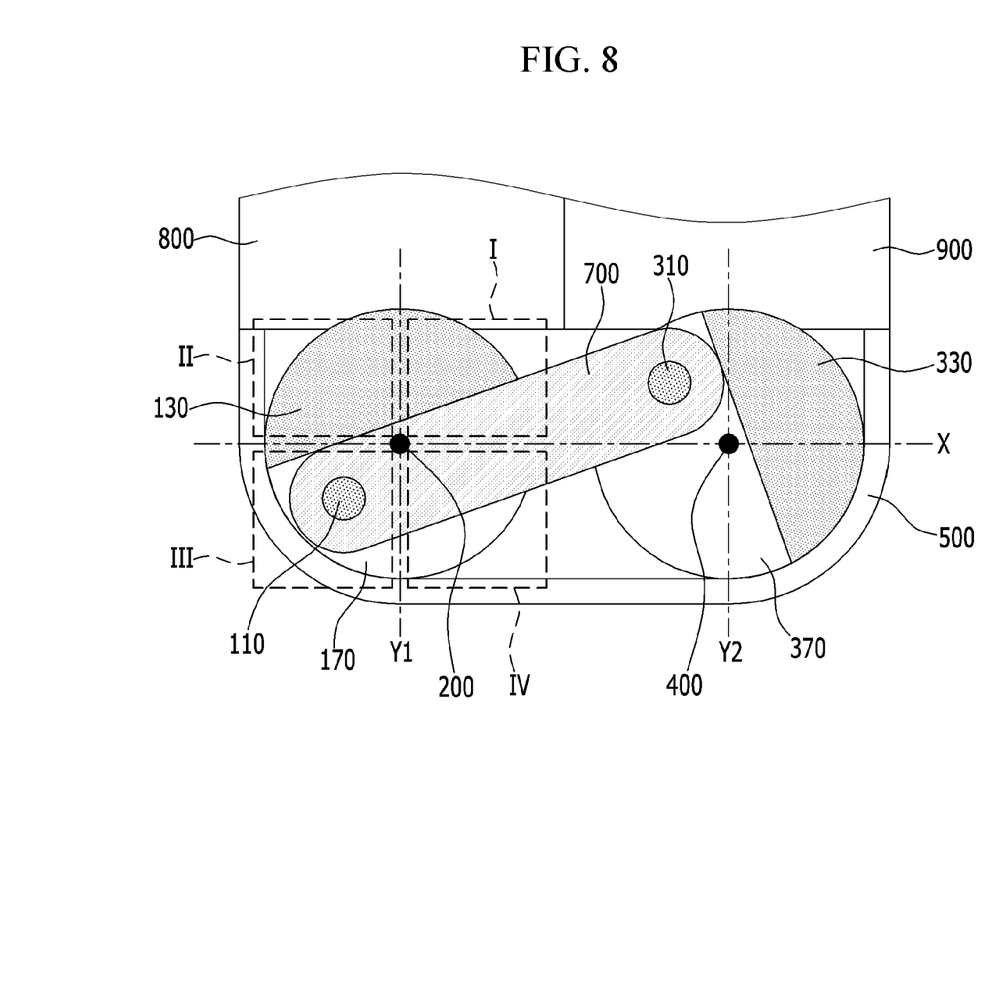

Referring to FIG. 8, when the first and second support portions 800 and 900 are folded with respect to each other, the first coupling protrusion 110 is positioned in the third quadrant of the first connecting plate 170. The link member 700 contacts the first stopper 130. The second coupling protrusion 310 is positioned in the second quadrant of the second connecting plate 370, that is, in the upper area of the plane.

Figure 9:
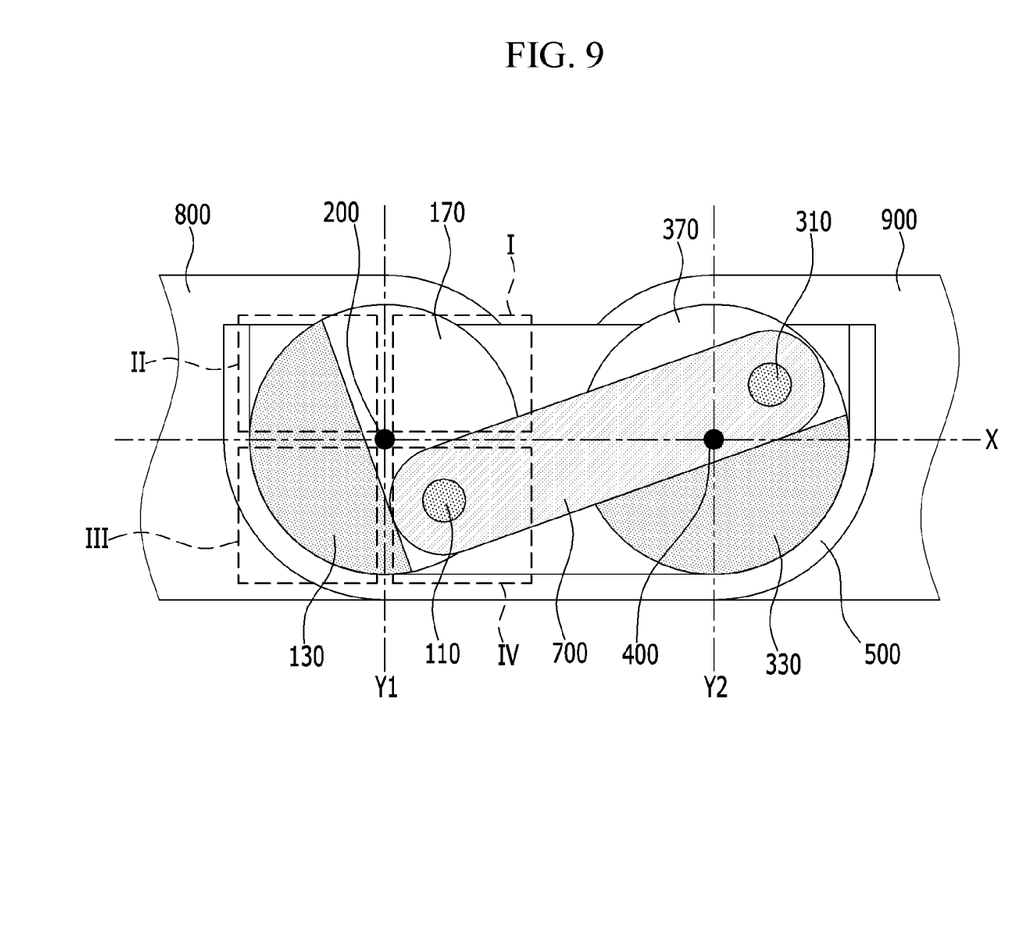

In addition, referring to FIG. 9, when the first and second support portions 800 and 900 are unfolded with respect to each other, the first coupling protrusion 110 is positioned in the fourth quadrant of the first connecting plate 170, that is, in the lower area of the plane. The second coupling protrusion 310 is positioned in the second quadrant of the second connecting plate 370, that is, in the upper area of the plane.

The link member 700 contacts the second stopper 330. The apparatus for supporting the display panel can be rotated by the structure for connecting the first and second connecting portions 100 and 300 with the link member 700 based on the two rotation shafts, irrespective of the distance between the two rotation shafts.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for supporting a display panel comprising:
    first and second support portions configured to support a display panel and respectively rotatable based on first and second rotation axes substantially parallel to each other;
    a first connecting portion fixedly combined to one side of the first support portion and configured to rotate together with the first support portion with respect to the first rotation axis;
    a second connecting portion fixedly combined to one side of the second support portion and configured to rotate together with the second support portion with respect to the second rotation axis;
    a spacer maintaining a constant distance between the first and second rotation axes, wherein portions of the first and second connecting portions penetrate the spacer to contact the first and second support portions; and
    a link member rotatably combined to one side of the first connecting portion and one side of the second connecting portion.

2. The apparatus of claim 1, wherein the first connecting portion includes:
    a first penetration member substantially parallel to the first rotation shaft and having one end portion penetrating the spacer to be fixedly combined to the one side of the first support portion; and
    a first connecting plate combined to the other end portion of the first penetration member and to which the link member is combined, and
    wherein the second connecting portion includes:
    a second penetration member substantially parallel to the second rotation axis and having one end portion penetrating the spacer to be fixedly combined to the one side of the second support portion; and
    a second connecting plate combined to the other end portion of the second penetration member and to which the link member is combined.

3. The apparatus of claim 2, further comprising a first coupling protrusion formed at one side of the first connecting plate and a second coupling protrusion formed at one side of the second connecting plate, and
    wherein the first and second coupling protrusions are combined to the link member such that they are rotatable.

4. The apparatus of claim 3, wherein, based on a plane including the first and second rotation axes and parallel with the first and second rotation axes, one of the first and second coupling protrusions is positioned in an upper area of the plane, and the other coupling protrusion is positioned in a lower area of the plane.

5. The apparatus of claim 4, wherein quadrants are formed on the first connecting plate by a first axis perpendicular to the first and second rotation axes and a second axis perpendicular to the first axis, and quadrants are formed on the second connecting plate by the first axis and a third axis perpendicular to the first axis and the second rotation axis, when the first and second support portions are folded with respect to each other, the first coupling protrusion is positioned in a first quadrant of the first connecting plate, and the second coupling protrusion is positioned in a fourth quadrant of the second connecting plate.

6. The apparatus of claim 5, wherein, when the first and second support portions are unfolded, the first coupling protrusion is positioned in a second quadrant of the first connecting plate, and the second coupling protrusion is positioned in a third quadrant of the second connecting plate.

7. The apparatus of claim 4, wherein quadrants are formed on the first connecting plate by a first axis perpendicular to the first and second rotation axes and a second axis perpendicular to the first axis, and quadrants are formed on the second connecting plate by the first axis and a third axis perpendicular to the first axis and the second rotation axis, when the first and second support portions are folded with respect to each other, the first coupling protrusion is positioned in a third quadrant of the first connecting plate, and the second coupling protrusion is positioned in a second quadrant of the second connecting plate.

8. The apparatus of claim 7, wherein, when the first and second support portions are unfolded, the first coupling protrusion is positioned in a fourth quadrant of the first connecting plate, and the second coupling protrusion is positioned in a first quadrant of the second connecting plate.

9. The apparatus of claim 2, wherein the first and second connecting plates have a circular shape.

10. The apparatus of claim 2, wherein the first and second connecting plates are formed on the same plane.

11. The apparatus of claim 2, wherein the first connecting portion further includes a first stopper protruding from the first connecting plate such that a first end portion of the link member is contacted and stopped by the first stopper when the first support portion rotates by a predetermined angle to prevent the first support portion from being rotated by more than the predetermined angle, and wherein the second connecting portion further includes a second stopper protruding from the second connecting plate such that a second opposing end portion of the link member is contacted and stopped by the second stopper when the second support portion rotates by the predetermined angle to prevent the second support portion from being rotated by more than the predetermined angle.

12. The apparatus of claim 11, wherein the first connecting portion further includes a first magnetic member positioned on the first stopper, wherein the second connecting portion further includes a second magnetic member positioned on the second stopper, and wherein the apparatus further comprises a third magnetic member configured to be combined to the first or second magnetic member and positioned on the link member.

13. The apparatus of claim 2, wherein first and second penetration holes are formed in the spacer to be penetrated by the first and second penetration members.

14. The apparatus of claim 1, wherein the first and second support portions form an angle of 0° to 180°.

15. The apparatus of claim 1, wherein, when the first and second support portions are rotated, the first and second support portions are respectively rotated with respect to the first and second rotation axes while maintaining the same angle therebetween.

16. The apparatus of claim 1, wherein the first and second support portions have a plate-like shape.

17. The apparatus of claim 1, wherein the link member is a bar-shaped member.

18. An apparatus for supporting a display panel comprising:
   first and second supports configured to support a display panel and at least partially rotate with respect to first and second rotation axes that are substantially parallel to each other;
   a first connector connected to the first support and configured to rotate together with the first support with respect to the first rotation axis;
   a second connector connected to the second support and configured to rotate together with the second support with respect to the second rotation axis;
   a spacer at least partially surrounding the first and second connectors, wherein each of the first and second connectors comprises a protrusion passing through a portion of the spacer to contact the respective first or second support and configured to maintain a constant distance between the first and second rotation axes, and wherein the protrusions are respectively parallel to the first and second rotation axes; and
   a link member rotatably connecting the first and second connectors.

19. The apparatus of claim 18, wherein the protrusions of the first and second connectors respectively contact the first and second supports.

20. The apparatus of claim 18, wherein the link member is configured to rotate the first and second connectors in opposite directions, and wherein the first and second supports are configured to rotate in opposite directions by the rotations of the first and second connectors.

21. The apparatus of claim 1, wherein the first and second support portions are configured to rotate from a first position where the first and second support portions directly contact each other to a second position where the first and second support portions do not directly contact each other.

* * * * *